No. 867,324. PATENTED OCT. 1, 1907.
E. P. WARNER.
POWER TRANSMISSION DEVICE.
APPLICATION FILED AUG. 15, 1906.

3 SHEETS—SHEET 1.

Witnesses:
O. M. Henniel
E. K. Lurdy

Inventor
Edward Percy Warner
by Frank D. Thomason
Atty

No. 867,324. PATENTED OCT. 1, 1907.
E. P. WARNER.
POWER TRANSMISSION DEVICE.
APPLICATION FILED AUG. 15, 1906.
3 SHEETS—SHEET 2.
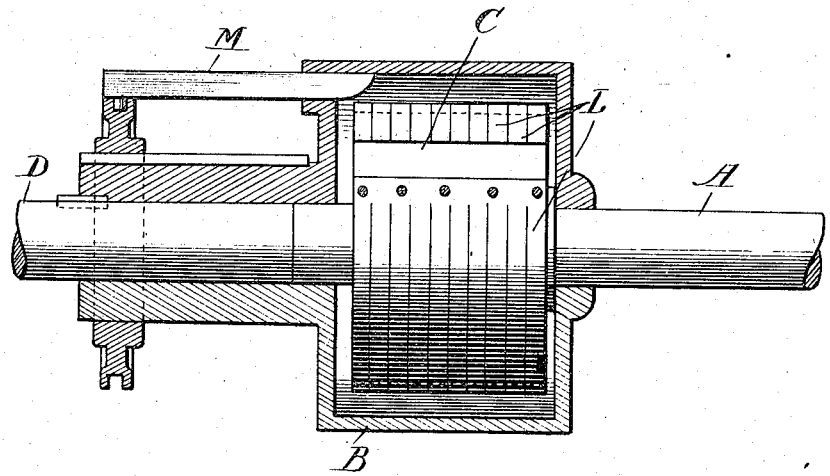
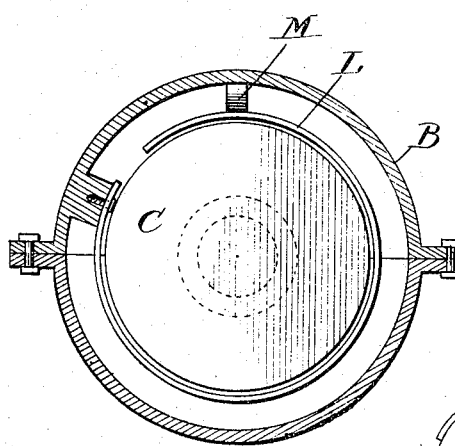
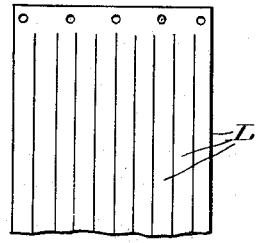
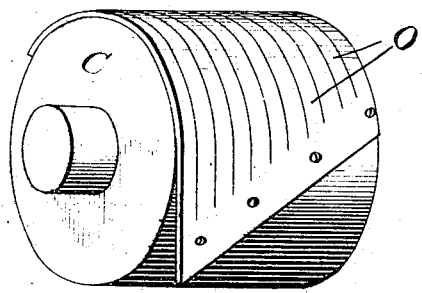
Witnesses:
Inventor
Edward Percy Warner
By Frank D. Thomason
Atty No. 867,324. PATENTED OCT. 1, 1907.
E. P. WARNER.
POWER TRANSMISSION DEVICE.
APPLICATION FILED AUG. 15, 1906.
3 SHEETS—SHEET 3.
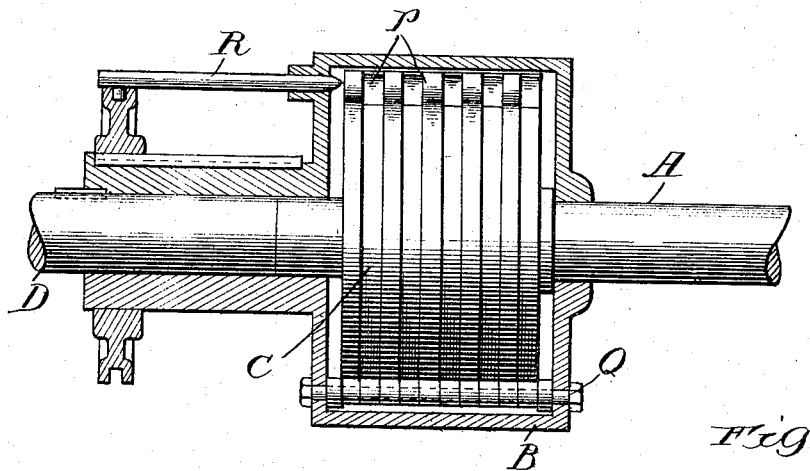
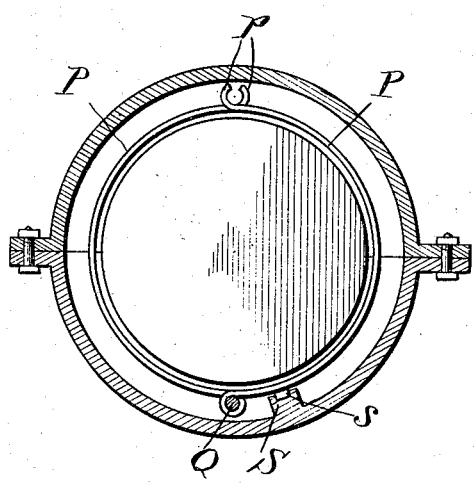
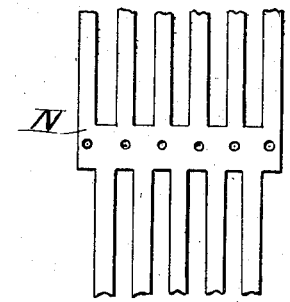
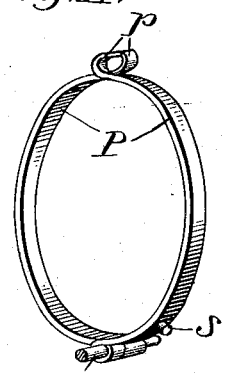
Witnesses:
Inventor:
Edward Percy Warner:
By Frank D. Thomason
Atty.

UNITED STATES PATENT OFFICE.

EDWARD PERCY WARNER, OF CHICAGO, ILLINOIS, ASSIGNOR, BY MESNE ASSIGNMENTS, TO WARNER CLUTCH COMPANY, A CORPORATION OF ILLINOIS.

POWER-TRANSMISSION DEVICE.

No. 867,324.

Specification of Letters Patent.

Patented Oct. 1, 1907.

Application filed August 15, 1906. Serial No. 330,730.

*To all whom it may concern:*

Be it known that I, EDWARD PERCY WARNER, a citizen of the United States, and a resident of Chicago, in the county of Cook and State of Illinois, have invented a new and useful Improvement in Power-Transmission Devices, of which the following is a full, clear, and exact specification.

Heretofore power transmission devices, such as those used in connection with the engines of automobiles and like machinery, have been objectionable because of the fact that they usually employ two oppositely formed clutch members, that are adapted to fit into each other when the engine is connected with the axle or hub of the machine, and have caused no end of annoyance because of the stripping or shearing of the teeth or interlocking features of the engaging parts, when the connection is made too quickly or by an inexperienced operator. Other forms of transmission devices are objectionable on account of the fact that connection is often made too rapidly or suddenly between the drive-shaft and the axle or driven-shaft of the automobile, this causing a severe jerk to the machine which is not only injurious to its mechanism but is unpleasant to the occupants.

My invention relates to a power transmission device by means of which the motion of the drive-shaft can be transmitted to the running gear, through the medium of a graduated application of friction, in such manner that the connection is scarcely noticeable nor the acceleration of speed resulting therefrom hardly perceptible. This is accomplished by the means hereinafter fully described, and as more particularly pointed out in the claims.

Figure 1:
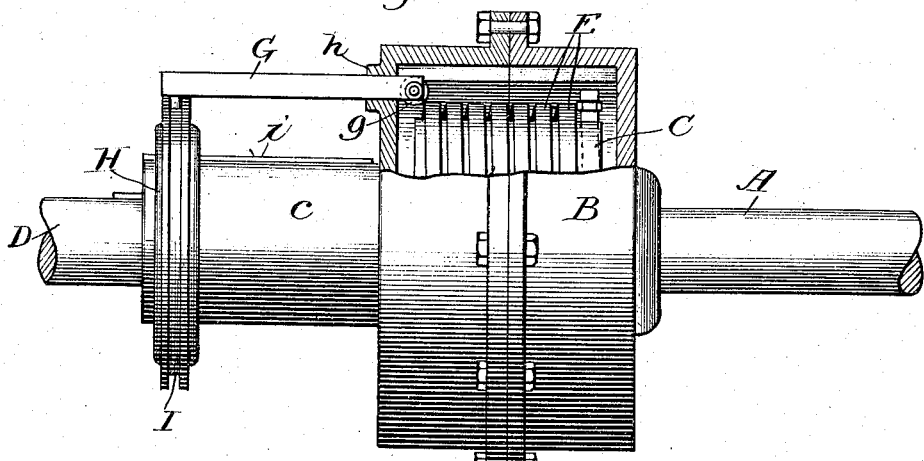
Figure 2:
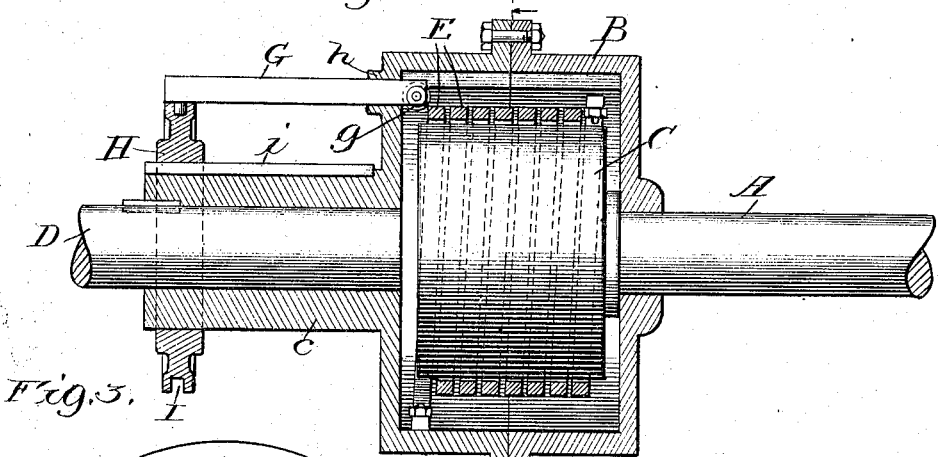
Figure 3:
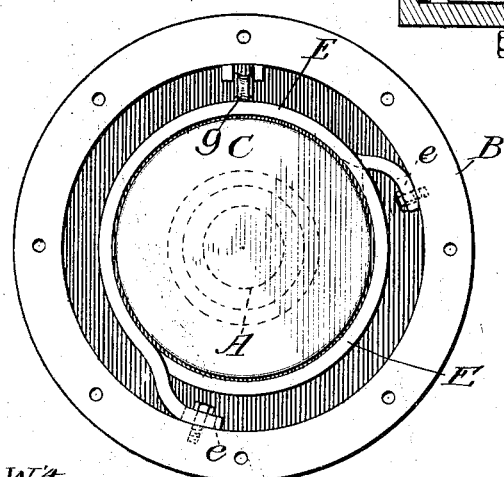
Figure 4:
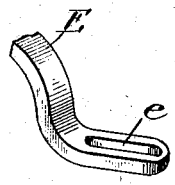

In the drawings, Figure 1 is a front elevation of my improved device applied, preferably to the driving-shaft of an automobile, showing a portion of the casing or shell broken away to disclose the friction coil and drum. Fig. 2 is a vertical longitudinal section through the central portion of the same. Fig. 3 is a transverse vertical section taken on dotted line 3,—3, Fig. 2. Fig. 4 is a detail view showing the end of the friction coil. Fig. 5 is a view similar to Fig. 2 showing a modified form of my invention. Fig. 6 is a transverse vertical section of the same. Fig. 7 is a view showing one of the friction-band plates in detail. Fig. 7ª is a plan view of a metal blank showing the manner of cutting the straps. Fig. 8 is a view showing a modified form of band. Fig. 9 is a central longitudinal view of another modification of my invention. Fig. 10 is a transverse vertical section therethrough, and, Fig. 11 is a detail view of one of the clamping members used in this modification.

Referring to the drawings, A represents the drive or power-shaft of a suitable engine or other motor mechanism that is extended to and preferably within a suitable casing or shell B where the outer end thereof is provided with an enlarged cylindrical head or drum C. This power-shaft and drum are adapted to revolve freely and independent of the other parts of the machine when the motor is disconnected therefrom. Shell B, which is preferably of a hollow cylindrical shape, and is made in two sections that are of such dimensions that they will readily accommodate the drum C, and the other members of the friction device. The side of the shell opposite the bearing for the power-shaft is provided with an outwardly elongated collar or bearing-boss c, that is lengthened in the direction of its axis, and into which the driving-shaft D of the automobile is keyed. Mounted loosely within the shell B, preferably on the inner circumference thereof, is a strong helically wound coil E of spring or drawn metal that surrounds but is normally out of contact with the drum C. The radial diameter of this coil is slightly greater than the diameter of the drum, thus permitting the latter to revolve by itself, as for example, when it is desired to stop the machine and keep the motor running. In order to produce friction between the drum and coil-spring I have provided one of more bars G, which increase or diminish the friction, as they move into or out of contact with the successive coils, in proportion to the number of the coils that are in frictional contact with said drum. This bar reciprocates longitudinally in a suitable bearing-boss $h$ formed in the vertical portion of the shell near the outer edge thereof, and it is provided with a contact roller or spool $g$ that has its periphery concaved to correspond to the curvature of the segment of the coil with which it comes into contact. This spool, however, is not absolutely necessary to the successful operation of this device and may be dispensed with and the bar itself brought into contact with the coils *seriatim*. The opposite end of this bar is provided with an inwardly projecting stud that engages the groove I cut in the periphery of a revoluble disk H mounted on the collar $c$ of the shell where it is adapted to reciprocate through the medium of an elongated key $i$. This disk may be manipulated in any suitable manner by an operating or hand-lever of ordinary type such as used in connection with clutches, which it is not necessary to show.

As the coils are progressively engaged by the contact bar G there is a certain amount of slack sent forward owing to the difference in diameter of the coils and drum. In order to provide a "take-up" for this slack, it has been found desirable to cut an elongated slot $e$ in each end of the coil-spring and pass the bolt or pin through said slot for the purpose of securing the coil to the shell. This permits the coil to be properly held in place in the shell and allows of a certain amount of longitudinal movement. To operate this friction device and connect the power-shaft of the motor with the driven-shaft of the machine, the lever is thrown in the proper direction to push the rod G into the shell and cause the roller or the end of the rod to come in contact with the first or subsequent coils of the spring in regular succession. As these coils are forced against the drum one by one an increasing amount of friction is produced between them and the drum until the presser bar has passed to a point where the driven parts or members will receive the full power and force of the motor and revolve coincident therewith. When it is desired to use this device with a reversed motor, i. e., when the machine is run backward, the motor is first stopped and the rod pushed into the shell until the roller has passed off the last coil. The engine is again started and the roller is brought into contact with the last coil and afterward the succeeding coils, thus taking up the friction from the end of the coil opposite where it commenced when the machine is moving forward.

In Figs. 5, 6, and 8, I have illustrated a modified form of friction member, the other elements remaining substantially the same as shown in the first four figures of the drawings. The modified friction member comprises a series of segmental bands or straps L, L, that are preferably made of strong sheet metal and are secured at one end in any suitable manner to the inner circumference of the shell B. These straps L, L, are preferably long enough to extend around the drum for about four-fifths of its circumference, and have their free ends terminate at a point slightly beyond the presser bar M. Straps L, L, may be of any desirable construction, although I much prefer to employ the form shown in detail in Fig. 7, wherein they are all stamped or cut out of a metal blank N so as to alternate when placed around the drum. Such a construction makes it possible to easily reverse the engine and machine without having to throw the presser-bar across the series of bands as above described and then begin the contact at the opposite side of the drum. It may be desirable to utilize less frictional surface of the bands as the presser-bar progresses over the same and for this purpose bands similar to O, O, (Fig. 8) may be used, each being shorter in length than the preceding band and secured by means of a diagonally cut plate to the shell.

Figs. 9, 10, and 11 show a modification that is different from either of the above-described constructions. In this latter modified form of friction member it is possible to do away entirely with the drum C and form a contact direct on the power-shaft, but I prefer to use the drum, as shown. Extending around said drum is a series of two-piece clamping jaws P, P, that are preferably all hinged or mounted on a single supporting rod Q that has its ends secured to the opposite heads of shell B. These clamping-jaws P, P, are preferably semicircular in shape and have their ends opposite the hinge extended past each other and turned back toward each other to form small hooks p p, substantially in the manner shown in the drawings.

Instead of employing the usual compression-bar a reciprocal rod R provided with a tapered forward end is inserted successively into the loops formed by the hooks p, p, thus forcing the same apart. This causes the clamping jaws to contract and engage the circumference of the drum. When sufficient friction has been produced to transmit the entire force of the power-shaft to the driven-shaft, the latter will revolve with said power-shaft.

In order to avoid any severe strain on the hinge or pivotal rod Q, it is desirable to cut an elongated transverse groove or slot S across the interior of the shell and provide the adjacent jaw of each clamp with an outwardly projecting lug s that is adapted to slip into said groove and engage the same, thus forming a more positive key between the two members.

What I claim as new and desire to secure by Letters Patent of the United States is:—

1. A power transmission device comprising a power-shaft; a driven-shaft; a friction member connected to said driven-shaft and means having a longitudinal reciprocal movement independent of said driving and driven members whereby it is adapted to engage said friction-member commencing at one end of the same and advancing to the other end thereof.

2. A power transmission device comprising a power-shaft; a drum mounted thereon; a driven-shaft; a friction member loosely connected to said driven-shaft; and means having a longitudinal reciprocal movement independent of said driving and driven members whereby it is adapted to engage said friction member commencing at one end of the same and advancing to the other end thereof.

3. A power transmission device comprising a power-shaft; a drum mounted thereon; a driven-shaft; a friction-member loosely connected to said driven-shaft and surrounding and normally out of contact with said drum and means having a longitudinal reciprocal movement independent of said driving and driven members whereby it is adapted to engage said friction member commencing at one end of the same and advancing to the other end thereof.

4. A power transmission device comprising a power-shaft; a drum mounted thereon; a driven-shaft; a cylindrical shell; a friction-member loosely connected to said shell and normally out of contact with said drum, and means having a longitudinal reciprocal movement independent of said driving and driven members whereby it is adapted to engage said friction-member commencing at one end of the same and advancing to the other end thereof.

5. A power transmission device comprising a power-shaft; a driven-shaft; a friction member consisting of a coil-spring connected to said driven-shaft; and a reciprocal rod adapted to contact with said friction member and cause the coils of the latter to progressively engage said power-shaft.

6. A power transmission device comprising a power-shaft; a drum mounted thereon; a driven-shaft; a friction member consisting of a coil-spring loosely connected to said driven-shaft; and a reciprocal rod adapted to contact with said friction member and cause the coils of the latter to progressively engage said drum.

7. A power transmission device comprising a power-shaft; a drum mounted thereon; a driven-shaft; a friction member consisting of a coil-spring loosely connected to said driven-shaft and surrounding and normally out of contact with said drum; and a reciprocal rod adapted to contact with said friction member and cause the coils of the latter to progressively engage said drum.

8. A power transmission device comprising a power-shaft; a drum mounted thereon; a driven-shaft; a cylindrical shell surrounding said drum and revoluble with said driven shaft; a friction member consisting of a coil-spring loosely connected to said shell and normally out of contact with said drum; and a reciprocal rod adapted to contact with said friction member and cause the coils of the latter to progressively engage said drum.

9. A power transmission device comprising a power-shaft; a drum mounted thereon; a driven-shaft; a cylindrical shell surrounding said drum and revoluble with said driven-shaft; a friction member consisting of a series of substantially flat segmental bands normally out of contact with said drum; and a reciprocal rod adapted to contact with said friction member and cause the bands of the latter to progressively engage said drum.

10. A power transmission device comprising a power-shaft; a driven-shaft; a friction member connected to said driven-shaft consisting of a series of substantially flat segmental bands; and a reciprocal rod adapted to contact with said friction member and cause the bands of the latter to progressively engage said power-shaft.

11. A power transmission device comprising a power-shaft; a drum mounted thereon; a driven-shaft; a friction member connected to said driven-shaft consisting of a series of substantially flat segmental bands; and a reciprocal rod adapted to contact with said friction member and cause the bands of the latter to progressively engage said drum.

12. A power transmission device comprising a power-shaft; a driven-shaft; a friction member connected to said driven-shaft consisting of a series of separable clamping-jaws each surrounding said power shaft and provided with hooked ends forming sectional rings; and a reciprocal rod adapted to pass through said rings and draw the clamping-jaws together whereby said power-shaft is progressively engaged by said friction member.

13. A power transmission device comprising a power-shaft; a drum mounted thereon; a driven-shaft; a friction member connected to said driven-shaft consisting of a series of separable clamping-jaws each surrounding said drum and provided with hooked ends forming sectional rings; and a reciprocal rod adapted to pass through said rings and draw the clamping-jaws together whereby said drum is progressively engaged by said friction member.

14. A power transmission device comprising a power-shaft; a drum mounted thereon; a driven-shaft; a cylindrical shell surrounding said drum and revoluble with said driven-shaft; a friction member connected to said shell consisting of a series of separable clamping-jaws each surrounding said drum and provided with hooked ends forming sectional rings; and a reciprocal rod adapted to pass through said rings and draw said clamping-jaws together whereby said drum is progressively engaged by the friction member.

15. A power transmission device comprising a power member, a driven member, a friction device connected to one of said members, and means having a longitudinal reciprocal movement independent of either of said members whereby it is adapted to engage said friction device commencing at one end of the same and advancing to the other end thereof.

16. A power transmission device comprising a power member, a drum mounted thereon, a driven member, a friction device connected to one of said members, and means having a longtitudinal reciprocal movement independent of either of said members whereby it is adapted to engage said friction device commencing at one end of the same and advancing to the other end thereof.

17. A power transmission device comprising a power member, a drum mounted thereon, a driven member, a friction device loosely connected to one of said members and surrounds and is normally out of contact with said drum, and means having a longitudinal reciprocal movement independent of either of said members whereby it is adapted to engage said friction device commencing at one end of the same and advancing to the other end thereof.

In testimony whereof I have hereunto set my hand and seal this 9th day of August, 1906.

EDWARD PERCY WARNER. [L. S.]

Witnesses:
W. J. McKay,
E. K. Lundy.